Patented Feb. 23, 1937

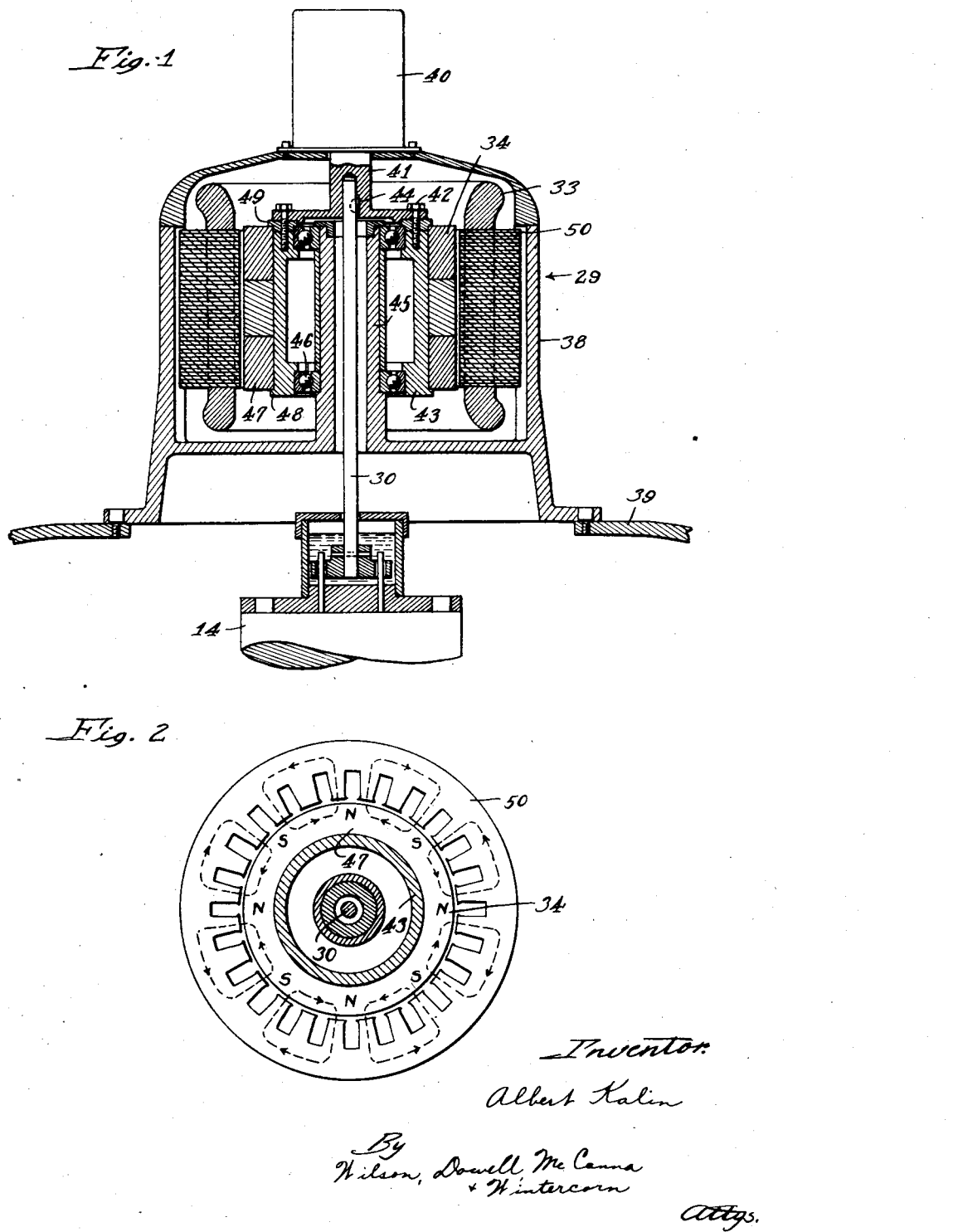

2,071,536

UNITED STATES PATENT OFFICE 2,071,536

GENERATOR

Albert Kalin, Rockford, Ill., assignor to Woodward Governor Company, Rockford, Ill., a corporation of Illinois Original application May 28, 1932, Serial No. 614,088. Divided and this application April 22, 1933, Serial No. 667,370

10 Claims. (Cl. 171—252)

This invention relates to generators, and is particularly concerned with a permanent magnet generator.

One important object of my invention is to provide a permanent magnet generator having permanent magnet fields preferably, though not necessarily, in the form of a simple ring without physical poles, which is magnetized in a number of places equal to the number of poles desired for the particular generator.

Another object consists in the novel method of magnetizing the permanent magnet fields by impressing polyphase alternating current on a stationary armature winding while the magnet rotor is free to revolve.

This application is a division of my copending application, Serial No. 614,088, filed May 28, 1932, patented Aug. 20, 1935, No. 2,011,859.

The invention is illustrated in the accompanying drawing, in which—

Figure 1 is a vertical cross-section through the permanent magnet generator, and Fig. 2 is a horizontal section through the rotor and stator thereof.

Similar reference numerals are applied to corresponding parts throughout the views.

The generator of my invention was designed originally for use in a speed governor drive for a hydro-electric or other type of power plant. The problem there is to have the speed of the governor kept exactly proportional to the speed of the prime mover. Considerable trouble was experienced with earlier electrical drives for speed governors due to the source of electric power for the speed governor being in some way affected by disturbances of an electrical nature occurring elsewhere in the electrical system of the power plant. I therefore aim to have the electrical drive for the speed governor completely divorced from any electrical connection with the rest of the electrical system of the power plant. I accomplished this, as stated in the parent application referred to above, by the provision of a permanent magnet generator 29 driven by a shaft connection 30 in synchronism with the prime mover and generator of the power plant. The shaft indicated at 14 is the shaft of the prime mover on which the rotor of the generator is mounted. In other words, there is nothing more than a mechanical connection with the prime mover to keep the generator 29 turning at the same speed, or if desired, at a speed exactly proportional to the speed of the prime mover. In most cases, however, it is preferred to have the permanent magnet generator directly connected to the shaft, as shown. The permanent magnet generator has only one electrical winding, its stator winding 33; the field excitation is supplied by a permanent magnet rotating field. 34 designates the permanent magnet rotor for supplying the field excitation. Now, the winding 33 is connected directly to the stator winding of the speed governor drive motor, as set forth in the parent application, the governor turning with the rotor of the motor. In that way the speed governor is driven at all times at a speed exactly proportional to the speed of the shaft 14 by what may be termed a combination mechanical and electrical drive, which is made possible by the use of a permanent magnet generator.

The housing 38 for the generator 29 is shown as supported on top of a housing 39 for an exciter which also has its armature mounted on the shaft 14, said exciter being for the purpose of exciting the generator previously referred to. This makes for compactness and neat appearance and facilitates providing the driving connection indicated at 30 between the rotor 34 of the generator and the shaft 14. The housing 38 also forms a support for the housing 40 of a speed limit switch, the rotary element of which is driven by the shaft 41 forming a continuation of the shaft 30. The shaft 41 is fastened as at 42 to the non-magnetic spider 43 forming part of the rotor 34, and a key 44 provides a detachable driving connection between the shafts 30 and 41. An arbor 45 is suitably formed integral with the housing 38 and serves as a support on which the rotor 34 is arranged to revolve, anti-friction bearings 46 being provided to make for easy running. The rotor 34 is made up of a number of magnet steel rings 47 fitting over the spider 43 in abutment with the annular rim 48 at the lower end thereof and clamped by means of a ring 49 fastened in place by the bolts 42. These rings are permanently magnetized in a manner which will soon be described, to provide any predetermined number of poles in, as distinguished from projecting from, the periphery of the rings. That is to say, the poles are evident as magnetized areas on the circular periphery of the rings 47, as indicated in dotted lines in Fig. 2. Eight poles happen to be illustrated, although, of course, the number might be two, four, six or any even number of poles, depending upon the number of poles of the polyphase stator winding 33, and also depending upon the use to which the generator is to be put, it being the chief advantage of the simple ring rotor construction that the same ring may be magnetized for whatever number of poles is desired. Considering that one dimension of ring may be used for a whole range of magneto generators, irrespective of the number of poles required, it is obvious how this reduces the number of parts necessary to cover a wide range of designs. The required magneto generator output at reduced generator speeds is obtained by stacking two, three or more magnetic steel rings and providing a corresponding stacking of stator laminations. The stator is made up of laminae 50 suitably mounted in the housing 38 and having the winding 33 previously mentioned inserted between the radial teeth formed on the inner periphery of the stator. The winding 33 is, of course, the one to which the wires leading to the stator winding of the speed governor drive motor are connected, as previously mentioned, and since field excitation is supplied by the permanent magnet rotor, the generator serves as a source of A. C. voltage, the current generated being conducted from the winding 33 in the turning of the rotor, without the necessity for any collector rings and brushes.

The rotor 34 may be magnetized in any suitable or preferred manner. For example, it may be magnetized apart from the stator by means of direct current impressed on a copper magnetizing winding, and removing the winding after magnetizing, which leaves the rotor with poles permanently magnetized in the periphery thereof. However, I prefer to accomplish the magnetization by having the rotor in place in the generator and simply momentarily connecting the generator at a standstill to a polyphase power supply of from ten to twenty times the normal generator voltage and disconnecting the generator as soon as it has motored up to synchronous speed. This is by far the most effective method of magnetization and much superior to any direct current method. I have found that a simple ring type rotor without physical poles but having permanent magnet fields of the kind mentioned will give equal performance to that of any rotor with regular physical poles. The fact that the rotor is magnetized by impressing sine wave polyphase alternating current on the stator winding and allowing the rotor to come up to synchronous speed, as a hysteresis-induction motor, results in flux distribution in the air gap of such description that a very close approach to a sine wave voltage is obtained from the machine when operating as a generator, even though the number of coils per phase per pole is small.

It is believed the foregoing description conveys a good understanding of all of the objects and advantages of my invention. The appended claims have been drawn so as to cover all legitimate modifications and adaptations.

I claim:

1. The method of making an A. C. generator which comprises inserting an unmagnetized rotor in a wound stator, then impressing sine wave polyphase alternating current on the stator winding while the rotor is free to turn and until the rotor turns up to synchronous speed whereby to magnetize the rotor, and then disconnecting said stator winding from the impressing source, the rotor being thereafter adapted to be turned to generate sine wave voltage in the stator winding.

2. The method of making an A. C. generator which comprises inserting an unmagnetized rotor in a wound stator, then impressing sine wave polyphase alternating current of a voltage from ten to twenty times the normal generator voltage on the stator winding while the rotor is free to turn and until the rotor has motored up to synchronous speed whereby to magnetize the rotor, and then disconnecting said stator winding from the impressing source, the rotor being thereafter adapted to be turned to generate sine wave voltage in the stator winding.

3. The method of making an A. C. generator which comprises inserting an unmagnetized rotor in a wound stator, then impressing sine wave polyphase alternating current of a voltage higher than the normal generator voltage on the stator winding while the rotor is free to turn and until the rotor has motored up to synchronous speed whereby to magnetize the rotor, and then disconnecting said stator winding from the impressing source, the rotor being thereafter adapted to be turned to generate sine wave voltage in the stator winding.

4. The method of making a polyphase A. C. generator which consists in taking a rotor of unmagnetized magnetic material and a stator having wound poles in circumferentially spaced relation to the periphery of said rotor, and passing current through the windings of the poles to produce magnetized segments in the periphery of the rotor corresponding in number and location to the poles of the stator, the current being allowed to flow long enough for the rotor to motor up to synchronous speed.

5. The method of making a polyphase A. C. generator which consists in taking a field element of unmagnetized magnetic material and an armature element having wound poles in circumferentially spaced relation to the periphery of the field element, and, while said elements are free to turn relative to each other, passing current through the windings of the poles to produce magnetized segments in the periphery of the field element corresponding in number and location to the poles in the armature element, the current being allowed to flow long enough for relative rotation between the elements up to synchronous speed.

6. The method of making an A. C. generator which comprises inserting an unmagnetized rotor in a stator having a group of circumferentially spaced poles with interconnected windings, then impressing sine wave polyphase alternating current on the windings to simultaneously magnetize the rotor to provide a group of poles corresponding in number and location to the stator poles, and then when the rotor reaches synchronous speed, disconnecting the stator windings from the impressing source.

7. A generator assembly comprising in combination a stator adapted for surrounding a rotor, physical poles on the stator in equally circumferentially spaced relation relative to the periphery of the rotor, polyphase windings on said poles, and an unmagnetized rotor of magnetizable material rotatable in said stator, said rotor having a smooth cylindrical periphery and being arranged to be rotated and magnetized by the initial energization of the stator windings by polyphase alternating current.

8. The method herein described of producing a permanently magnetized rotor for an alternating current generator which comprises, assembling an unmagnetized rotor of magnetizable material within a stator having a polyphase alternating current winding, and impressing polyphase alternating current on the stator winding to effect the rotation of the rotor until it turns up to synchronous speed.

9. The method herein described of producing a permanently magnetized field element for an alternating current generator which comprises assembling an unmagnetized field element of magnetizable material in assembled relation to an armature element having a polyphase alternating current winding, and impressing polyphase current on the armature winding to effect relative rotation between the armature and field elements until synchronous speed is reached.

10. A generator assembly comprising, in combination, an armature element, physical poles thereon in equally circumferentially spaced relation with respect to the cooperating field element, polyphase windings on said armature element, and an unmagnetized field element of magnetizable material in assembled operative relation to said armature element permitting relative rotation therebetween, said field element having a smooth periphery and being arranged to be magnetized by the initial energization of the armature windings by polyphase alternating current.

ALBERT KALIN.